(12) United States Patent
Keren

(10) Patent No.: US 9,291,276 B2
(45) Date of Patent: Mar. 22, 2016

(54) IRRIGATION VALVE

(75) Inventor: Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 248 days.

(21) Appl. No.: 14/008,794

(22) PCT Filed: Feb. 26, 2012

(86) PCT No.: PCT/IB2012/050874
§ 371 (c)(1),
(2), (4) Date: Sep. 30, 2013

(87) PCT Pub. No.: WO2012/131503
PCT Pub. Date: Oct. 4, 2012

(65) Prior Publication Data
US 2014/0014202 A1    Jan. 16, 2014

Related U.S. Application Data

(60) Provisional application No. 61/469,110, filed on Mar. 30, 2011.

(51) Int. Cl.
*F16K 31/126* (2006.01)
*F16K 7/17* (2006.01)

(52) U.S. Cl.
CPC ............... *F16K 7/17* (2013.01); *F16K 31/126* (2013.01); *F16K 31/1268* (2013.01); *Y10T 137/7836* (2015.04)

(58) Field of Classification Search
CPC ..... F16K 7/17; F16K 31/126; F16K 31/1268; Y10T 137/7836
USPC ........................... 239/106, 110, 542, 570, 571
See application file for complete search history.

(56) References Cited

U.S. PATENT DOCUMENTS

| 1,506,012 | A |   | 8/1924 | Lewis |
|---|---|---|---|---|
| 2,738,157 | A |   | 3/1956 | Vargo |
| 2,940,722 | A | * | 6/1960 | Vargo ................ F16K 31/404 251/30.03 |
| 3,424,185 | A | * | 1/1969 | Lansky ............... F16K 15/141 137/102 |
| 3,457,893 | A | * | 7/1969 | Lavalier ............ B01D 46/0068 116/137 R |
| 3,633,613 | A |   | 1/1972 | Julow |
| 4,251,048 | A | * | 2/1981 | Aurell ................. F16K 31/402 251/30.05 |
| 4,596,265 | A | * | 6/1986 | Goodell .............. B60T 15/54 137/102 |
| 4,729,401 | A | * | 3/1988 | Raines ........................ 137/512 |

(Continued)

FOREIGN PATENT DOCUMENTS

| FR | 2625544 A1 | 7/1989 |
|---|---|---|
| GB | 2429261 A | 2/2007 |
| JP | 2010 121703 A | 6/2010 |
| WO | WO 2010/058726 | 5/2010 |

OTHER PUBLICATIONS

International Search Report dated Jun. 13, 2012 issued in PCT counterpart application (No. PCT/IB2012/050874).

(Continued)

*Primary Examiner* — Marina Tietjen
*Assistant Examiner* — Daphne M Barry
(74) *Attorney, Agent, or Firm* — Womble Carlyle

(57) ABSTRACT

An irrigation valve has a liquid passage, a sealing diaphragm and a control port that can receive control signals. The sealing diaphragm is held in the valve in a non clamped manner and is adapted to seal the passage. Upon receipt of a control signal the sealing diaphragm bends and opens a path for liquid around the sealing diaphragm that can exit the valve.

24 Claims, 5 Drawing Sheets

(56) References Cited

U.S. PATENT DOCUMENTS

| | | | |
|---|---|---|---|
| 5,465,905 A * | 11/1995 | Elder | 239/75 |
| 5,829,473 A | 11/1998 | Hajbi et al. | |
| 6,089,532 A | 7/2000 | Rohloff et al. | |
| 6,557,819 B2 * | 5/2003 | Austin | 251/28 |
| 2006/0163388 A1 * | 7/2006 | Mari | 239/542 |

OTHER PUBLICATIONS

Written Opinion dated Jun. 13, 2012 issued in PCT counterpart application (No. PCT/IB2012/050874).

* cited by examiner

IRRIGATION VALVE

RELATED APPLICATIONS

This is a 35 USC 371 U.S. National Phase of International Application No. PCT/IB2012/050874, filed 26 Feb. 2012 and published in English as WO 2012/131503A1 on 4, Oct. 2012, which claims priority to U.S. Provisional application No. 61/469,110, filed 30 Mar. 2011. The contents of the aforementioned applications are incorporated by reference in their entirety.

TECHNICAL FIELD

Embodiments of the present invention relate to irrigation valves and in particular to irrigation valves that are controlled by an external signal.

BACKGROUND

In such valves the external signal may be fluid pressure and the fluid pressure may control the opening and/or closing of the valve.

U.S. Pat. No. 5,829,473 describes a hydraulic or a pneumatic control signal that is introduced into a hydraulic valve by way of hydraulic or pneumatic pressure. This pressure applies a force on a diaphragm thus causing the diaphragm to move to a position in which it closes the valve for passage of fluid therethrough.

SUMMARY

The following embodiment and aspects thereof are described and illustrated in conjunction with systems, tools and methods which are meant to be exemplary and illustrative, not limiting in scope.

In an embodiment of the present invention there is provided an irrigation valve comprising a liquid passage extending therethrough at least in part along an axis, a sealing diaphragm operatively coupled to the passage and a control port for receiving a control signal, the sealing diaphragm being held in the valve in a non clamped manner and being adapted to seal the passage, wherein upon receipt of a control signal the sealing diaphragm is urged to elastically bend to thereby open a path for liquid around the sealing diaphragm that flows downstream to exit the valve.

Optionally, the sealing diaphragm comprises opposing up and down surfaces and a peripheral side surface therebetween, the up and down surfaces respectively face upstream and downstream and at least a portion of the path for liquid around the sealing diaphragm flows in contact with the diaphragm along an imaginary route extending first upon the up surface then upon the side surface and then upon the down surface.

If desired, the control signal is in the form of liquid pressure flowing inwards into the valve.

Typically, the irrigation valve comprises an elastic control diaphragm located inward of the control port, the control diaphragm adapted to bend under the pressure of the control signal to thereby transfer a signal inwardly that causes the bending of the sealing diaphragm that forms the path around the sealing diaphragm.

Optionally, the control diaphragm when bended substantially seals the valve to inward flow of the control signal passed the control diaphragm.

Typically, the sealing diaphragm is adapted to be biased axially upstream and axially downstream and at least when biased upstream is adapted to bear against a support of the valve and at least when biased downstream is adapted to bear against a rim of the valve, wherein the non clamped manner that the sealing diaphragm is held in the valve is characterized by the support not axially overlapping the rim.

Preferably, the sealing diaphragm when bearing against the rim seals the passage for liquid flow.

In an embodiment there is also provided an irrigation pipe comprising an irrigation valve in accordance with the present invention.

Optionally, the irrigation valve is coupled to an end of the pipe and the opening of the path through the valve is adapted to flush liquid out of the pipe.

Further optionally, the irrigation valve is coupled to a beginning of the pipe and the opening of the path through the valve is adapted to allow liquid to flow downstream into the pipe.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
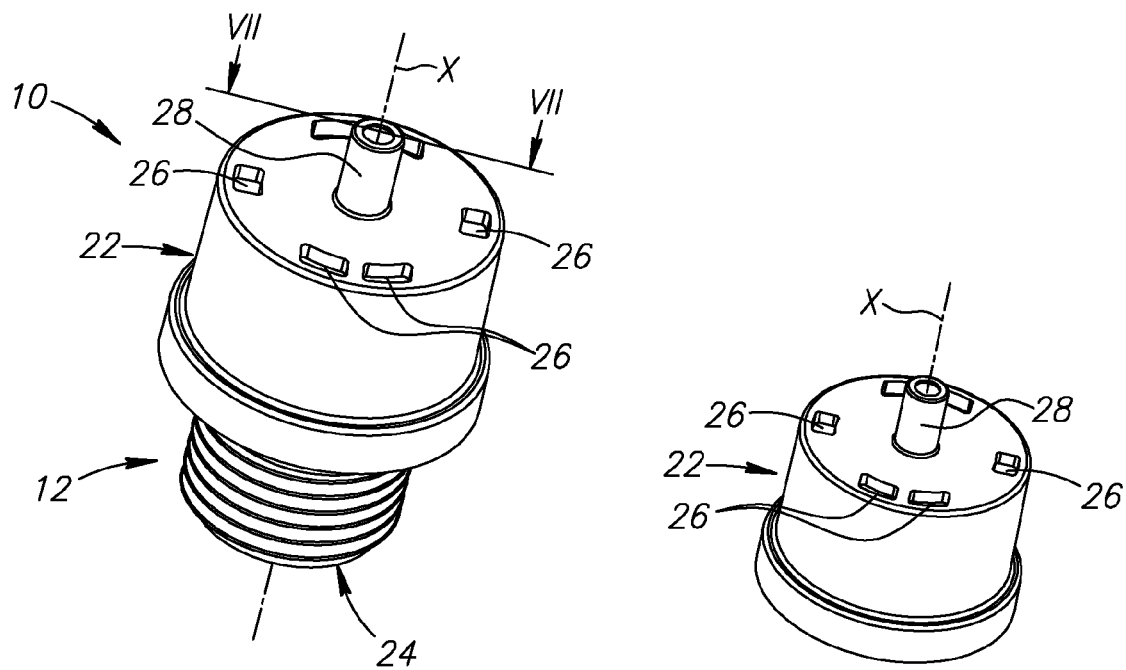
FIG. 1 shows a perspective top view of an irrigation valve in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
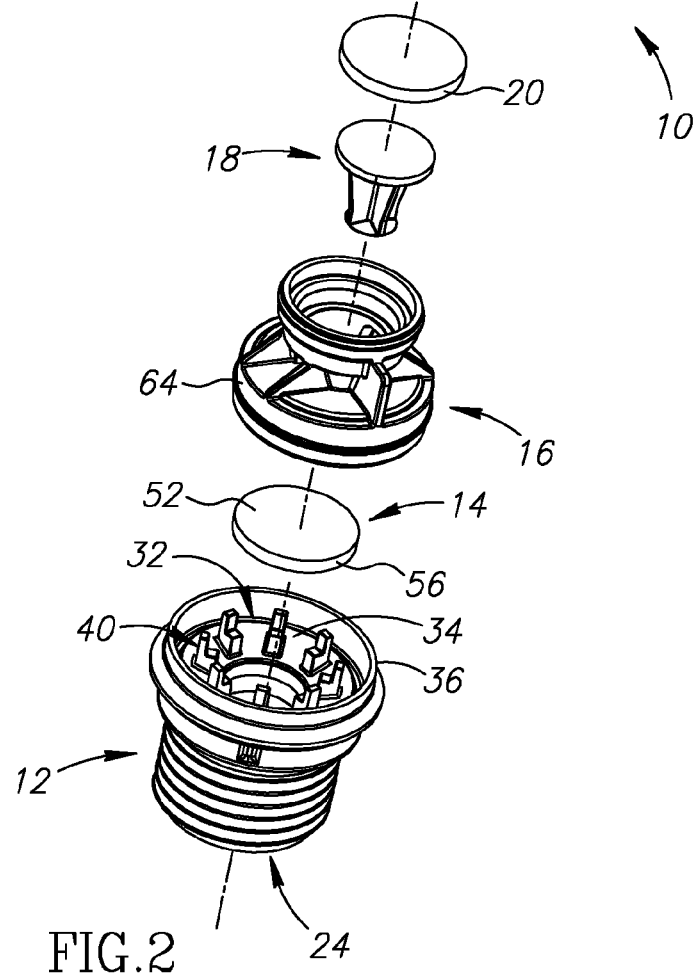
FIG. 2 shows an exploded view of the valve shown in FIG. 1.

Attention is first drawn to FIGS. 1 and 2. An irrigation valve 10 in accordance with an embodiment of the present invention may have a base 12, a sealing diaphragm 14, a partition 16, a piston 18, a control diaphragm 20 and a casing 22. The valve 10 has an inlet 24 that is formed at an upstream side of the valve 10 in the base 12. An outlet 26 of the valve 10, in an optional form of several apertures, is optionally formed at a downstream side of the valve 10 in the casing 22, and the valve 10 has in addition a control port 28 that is optionally formed in the casing 22 for receiving external control signals for controlling the operation of the valve 10.

The valve 10 extends along an axis X and has a liquid passage that is formed therein and provides liquid communication between the inlet 24 and the outlet 26. An upstream portion of the passage is in the form of an axially extending lumen 30 (best seen in FIGS. 7A and 7B) that is formed in the base 12 and opens out of the base 12 at the inlet 24. It should be noted that directional terms appearing throughout the specification and claims, e.g. "inner", "outer", "up", "down", "upstream", "downstream", etc., (and derivatives thereof) are for illustrative purposes only, and are not intended to limit the scope of the appended claims and that the directional terms "down", "below" and "lower" (and derivatives thereof) define identical directions.

In addition it is noted that the directional terms "up" and "down" (and derivatives thereof) refer to opposing directions extending along the axis X which may coincide respectively with the downstream and upstream flow directions where the flow through the valve 10 extends along the axis X such as optionally in the lumen 30. Finally it is noted that each part of the valve 10 even when shown by itself will be described herein as in its respective orientation in the assembled valve 10 and therefore in relation to the axis X and to the up, down, downstream and upstream directions.

Figure 3:
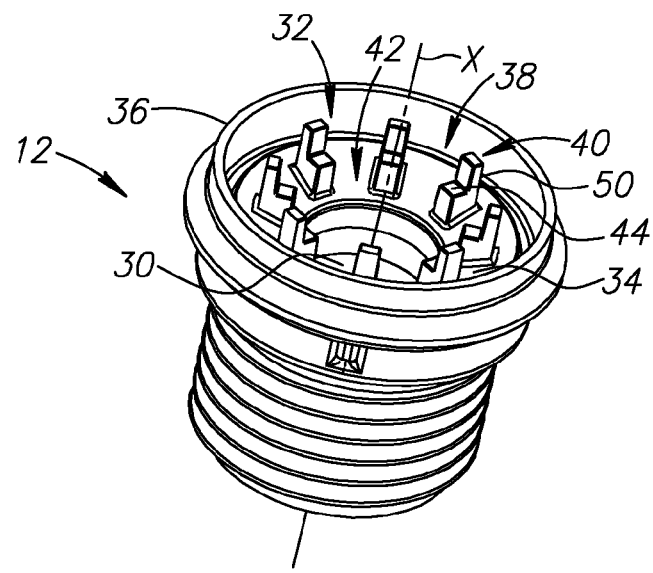
FIG. 3 shows a perspective top view of a base of the valve.
Figure 4A:
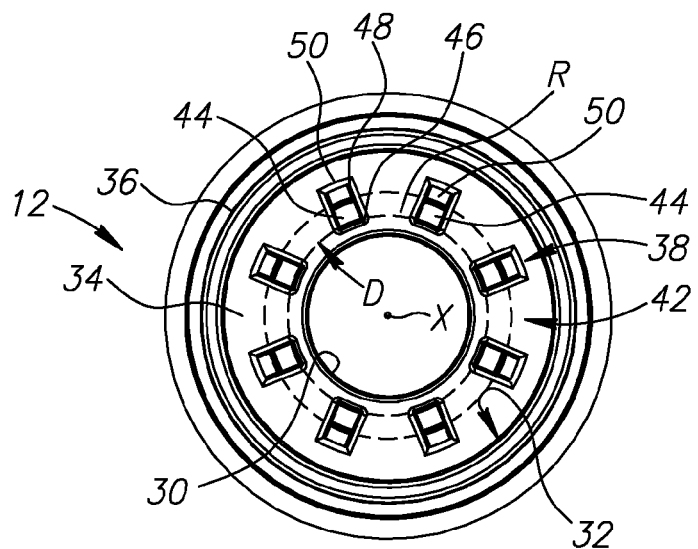
FIG. 4A shows a top view of the base of the valve.

Attention is drawn to FIGS. 3 and 4A. A recess 32 of the base 12 that constitutes a part of the passage is formed at a downstream side of the base 12 and the lumen 30 opens downstream into the recess 32. The recess 32 is partially bound by an upwardly facing floor 34 of the base 12 and a raised wall 36 of the base 12 that is formed about a perimeter of the floor 34 and projects axially downstream above the floor 34. A support 38 of the base 12 that optionally includes a plurality of bulges 40 is formed in the recess 32. The bulges 40 are located upon the floor 34 of the base 12 in an optional symmetrical pattern about the axis X with each bulge 40 projecting downstream above the floor 34 and being separated from an adjacent bulge 40 by a gap 42.

Each bulge 40 has an upwardly facing seat 44 that has an inner end 46 proximal to the axis X and an outer end 48 distal to the axis X; and a protrusion 50 of each bulge 40 that is outward in relation to the seat 44 protrudes up above the seat 44 from adjacent the outer end 48 of the seat 44. An optional effective supporting region of the support 38 is defined by an imaginary flat ring R that extends about the axis X and passes through each seat 44 between its inner and outer ends 46, 48. An inner periphery of the ring R that defines an inner diameter D of the ring R extends through the inner ends 46 of the seats 44.

Figure 4B:
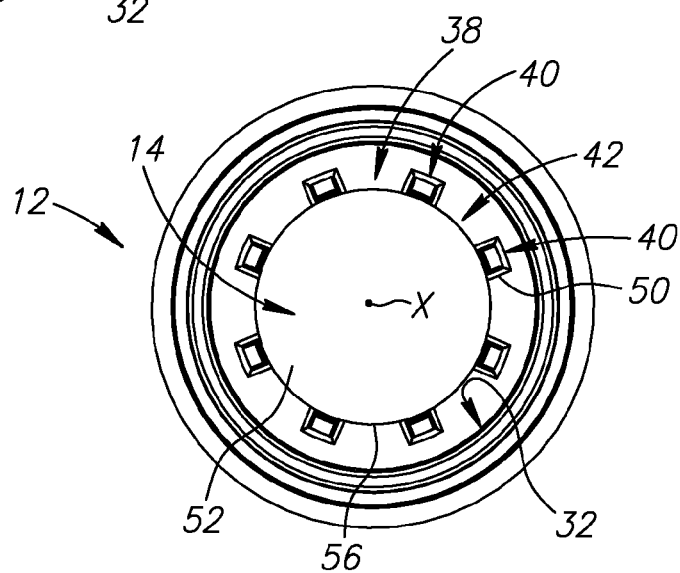
FIG. 4B shows a top view of the base and a sealing diaphragm of the valve being supported by the base.

Attention is drawn to FIG. 4B. The sealing diaphragm 14 is optionally disc shaped and has a top surface 52 facing downstream, a bottom surface 54 (seen in FIGS. 7A and 7B) facing upstream and a peripheral side surface 56 that connects the top and bottom surfaces 52, 54. In the valve 10, the sealing diaphragm 14 is located in the recess 32 of the base 12 with its bottom surface 54 at a peripheral region thereof overlying the seats 44 of the support 38. In this position, the sealing diaphragm 14 is snuggly received in the support 38 optionally resting upon the seats 44 and peripherally bounded at spaced apart locations by the protrusions 50 of the bulges 40.

Figure 5:
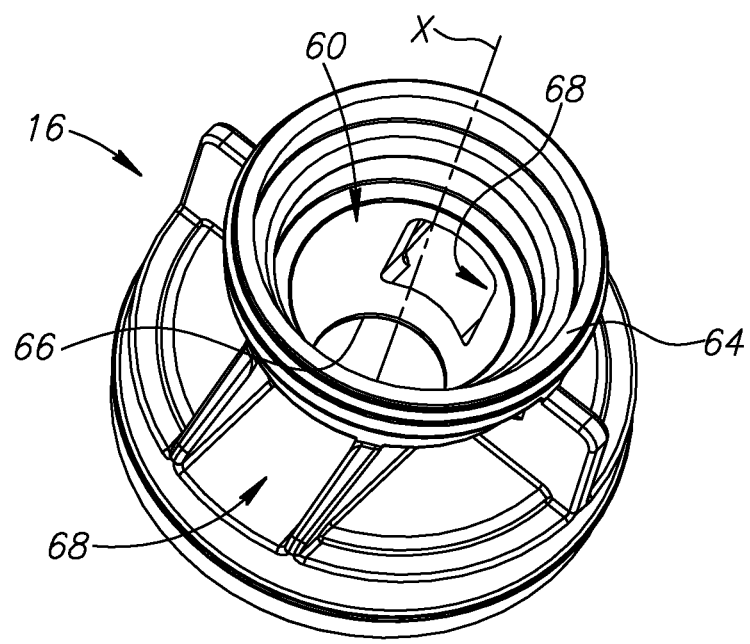
FIG. 5 shows a perspective top view of a partition of the valve.
Figure 6:
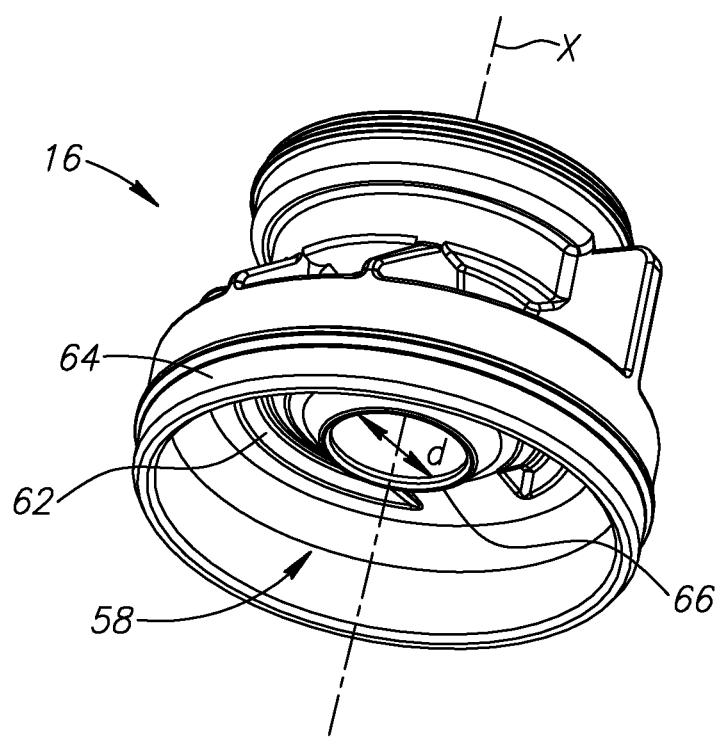
FIG. 6 shows a perspective bottom view of the partition of the valve.

Attention is drawn to FIGS. 5 and 6. The partition 16 has a lower cavity 58 and an upper cavity 60 that extend axially one after the other in the partition. The lower cavity 58 is partially bound by a downwardly facing roof 62 of the partition 16 and a shroud 64 of the partition 16 that is formed about a perimeter of the roof 62 and projects axially upstream below the roof 62. The upper cavity 60 opens out of the partition 16 at its upper side at an aperture 64 and opens down into the lower cavity 58 at a raised rim 66 that protrudes down beyond the roof 62 into the lower cavity 58. The raised rim 66 is optionally circularly formed about the axis X and has a diameter d. The partition 16 has in addition two key ways 68 that extend sideways out of the partition 16 and away from the axis X to provide communication between the upper cavity 60 and the environment surrounding the partition 16.

Attention is drawn to FIGS. 2 to 6. In the valve 10, the partition 16 is received on the base 12 with its shroud 64 being snugly surrounded by the wall 36 of the base 12 and its lower cavity 58 being joined with the recess 32 of the base 12 to define a chamber 70 of the valve 10 (chamber 70 can be seen in FIGS. 7A and 7B). The sealing diaphragm 14 is kept confined in the chamber 70 between the base 12 and the partition 16 such that movement of the sealing diaphragm 14 downwards (upstream) will cause the sealing diaphragm 14 to bear against the support 38 at the seats 44 and movement of the sealing diaphragm 14 upwards (downstream) will cause the sealing diaphragm 14 to bear against the rim 66.

Figure 7A:
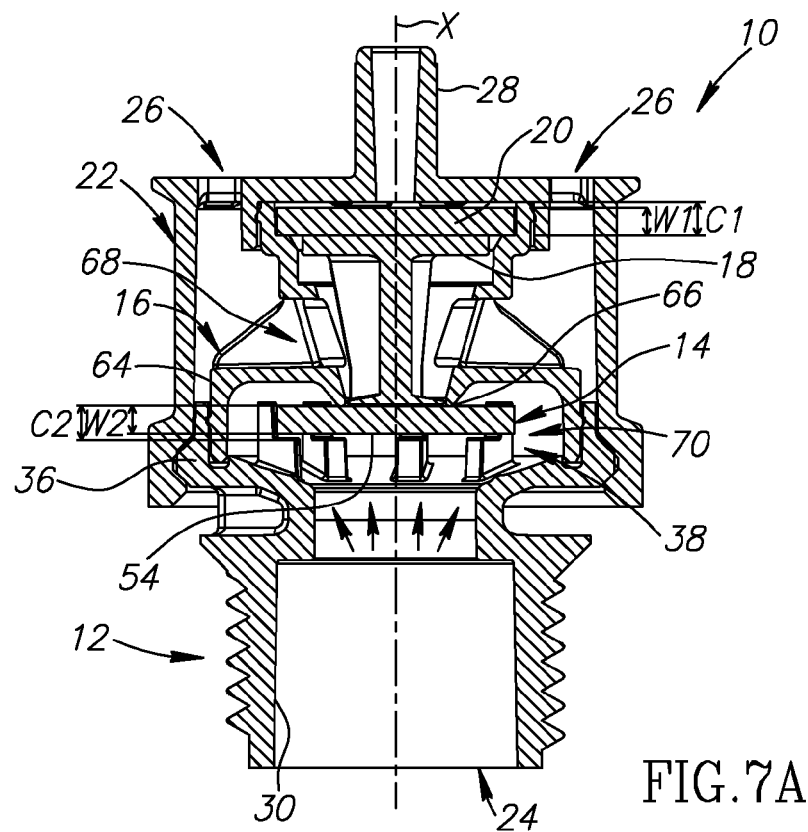
FIG. 7A shows a cross sectional view of the valve in a closed state.
Figure 7B:
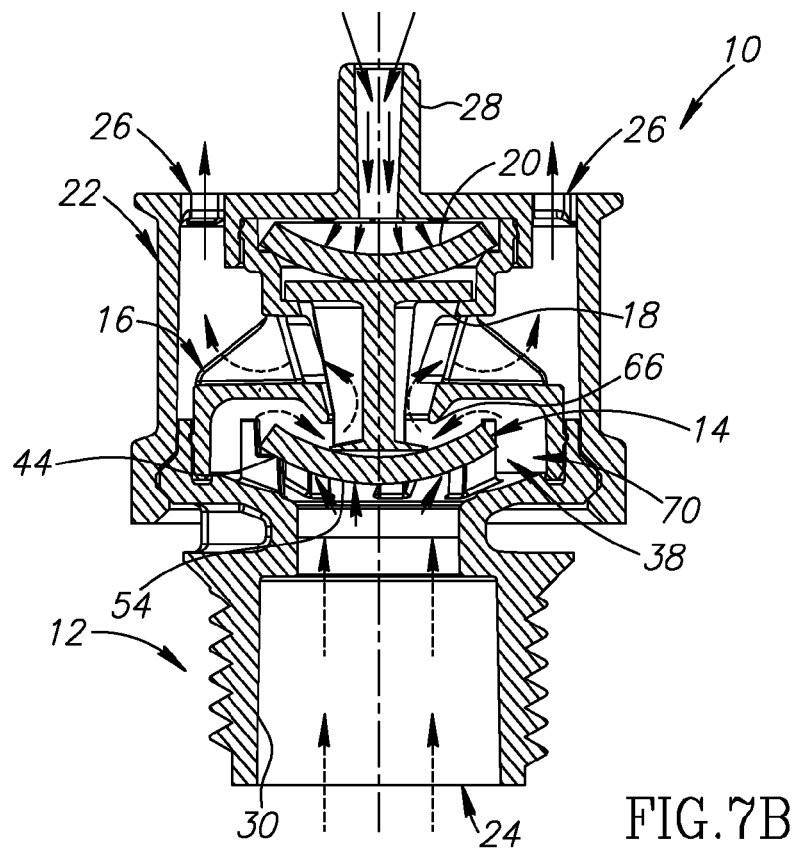
FIG. 7B shows a cross sectional view of the valve in an open state.

Attention is drawn to FIGS. 7A and 7B. In the valve 10 the control diaphragm 20 is placed adjacent the aperture 64 of the partition 16 between the control port 28 and an upper side of the piston 18. Control diaphragm 20 has a width W1 measured along the axis X that is optionally smaller than the axial distance C1 between portions of the valve 10 that axially confine the control diaphragm 20 so that control diaphragm 20 is axially confined in the valve 10 in a "floating" "non clamped" manner. The control diaphragm 20 is adapted to transfer control signals received at the control port 28 into the valve 10 towards the piston 18 and the piston 18 is slidably received in the upper cavity 60 of the partition 16 and is adapted to be urged downwards (upstream) to protrude at a lower side thereof via the rim 66 into the chamber 70 of the valve 10. The base 12 of the valve 10 is adapted to attach to an upstream fluid source (not shown) by optional threads that are formed on an outer face thereof. Optionally, other means may be provided at the base 12 for attachment to the fluid source such as for example a barb member (not shown) or any other connector or attachment means that may be suitable in the application in which the valve 10 is used.

In a closed state of the valve 10 (FIG. 7A), fluid under pressure that entered the valve 10 via the inlet 24, occupies the lumen 30 of the valve 10 and bears against the sealing diaphragm 14 to urge the sealing diaphragm 14 to abut and/or bear against the rim 66 and seal the passage of fluid through the valve 10. To form an open state in the valve 10 (FIG. 7B), a control signal in an optional form of fluid is urged into the valve 10 via the control port 28 to bear against the control diaphragm 20. Above an optional threshold pressure of the fluid at the control port 28, the fluid pressing against the control diaphragm 20 flexes the control diaphragm 20 and urges the piston 18 inwardly into the valve 10 until the lower side of the piston 18 protrudes into the chamber 70 of the valve 10 via the rim 66 and thereby flexes the sealing diaphragm 14 off the rim 66.

In accordance with some of the embodiments of the present invention, the sealing diaphragm 14 has a width W2 measured along the axis X that is optionally smaller than the axial distance C2 between the rim 66 and the seats 44 of the support 38 that axially confine the sealing diaphragm 14 in the chamber 70 so that the sealing diaphragm 14 is axially confined in the chamber 70 of the valve 10 in a "floating" "non clamped" manner between the rim 66 and the support 38. In some embodiments however the sealing diaphragm 14 may be axially confined in the chamber 70 in a "non-floating" manner that is characterized by width W2 being slightly larger than axial distance C2. This may increase the threshold pressure that is required in order to open the valve 10 as now also the pressure of the diaphragm 14 that is pressed against the rim 66 has to be overcome for the valve 10 to assume its open state.

In accordance with some of the embodiments of the present invention the diameter d of the rim 66 (d is indicated in FIG. 6) is optionally smaller than the diameter D of the effective supporting region of the support 38 (D is indicated in FIG. 4A) and thereby the rim 66 and the effective supporting region of the support 38 do not axially overlap or overlie each other. Therefore in such embodiments the sealing diaphragm 14 may be defined as being kept axially confined in a "non clamped" manner between portions of the valve 10 (e.g. rim 66 and seats 44) that do not axially overlap or overlie each other.

The optional "non clamped" and/or "floating" manners in which the diaphragms 14, 20 are confined in the valve 10 may assist to prolong the effective period of time that they may effectively function in the valve 10. Stress that may have been present in the diaphragms 14, 20 if they were clamped in the valve, could shorten the effective period of time that they may function. Such stress that may have been formed for example between clamped portions of the diaphragms that are kept substantially fixed in place and portions of the diaphragms that are urged to flex, is substantially avoided when the diaphragms are held in a "non clamped" and/or "floating" manner in the valve 10. Diaphragms 14, 20 when urged to flex are adapted to slightly slide upon the surfaces of the valve 10 that they bear against which results in the effect that they substantially only bend and only exhibit stress due to bending and substantially avoid any additional stress that may have been present if they were clamped in the valve 10.

Attention is drawn to FIG. 7B. In the open state of the valve 10, the lifting of the sealing diaphragm 14 off the rim 66 forms a space between the top surface 52 of the sealing diaphragm 14 and the rim 66 that allows for a fluid flow indicated by dashed arrows to be formed through the valve 10. Fluid upstream of the valve 10 may now flow downstream via inlet 24 into the lumen 30 of the valve 10 to bypasses the sealing diaphragm 14. The fluid flows via the gaps 42 of the support 38 and then over the top surface 52 of the sealing diaphragm 14 and through the space between surface 52 and rim 66 into the upper cavity 60 of the partition 16. From there, the fluid flows laterally away from the axis X via the key ways 68 of the partition 16 to the environment that is seized between the casing 22 and the partition 16 and from there the fluid flows out of the valve 10 through the outlets 26 in the casing 22 to the outside environment outside of the valve.

Figure 8:
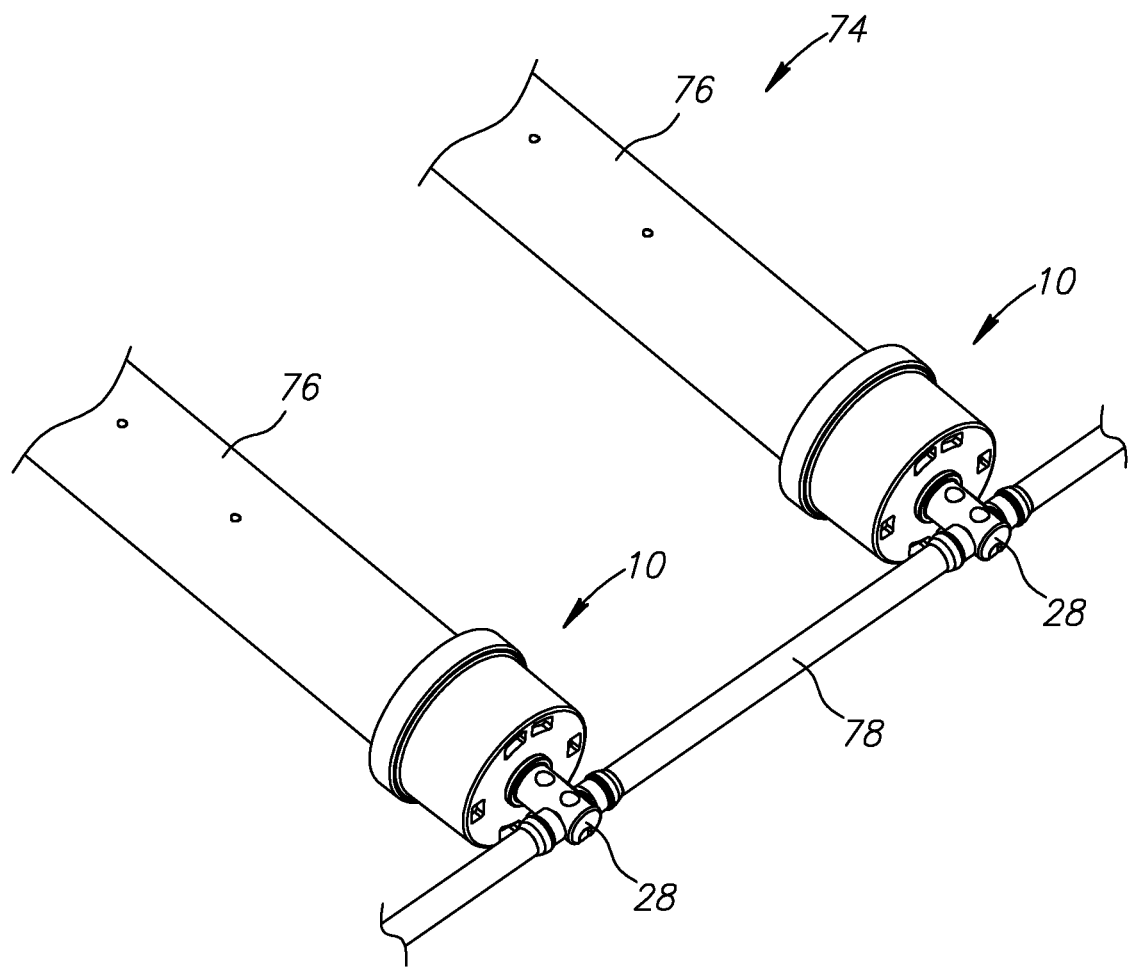
FIG. 8 shows a perspective view of a portion of an irrigation system incorporating a valve in accordance with an embodiment of the present invention.

Attention is now drawn to FIG. 8. In an embodiment of the present invention, the valve 10 is adapted to be used in a drip irrigation system 74 that includes a plurality of drip irrigation lines 76 that are laid in a field for irrigating the field. Optionally, an end of each drip irrigation line 76 is coupled to a given valve 10 and a control tube 78 that is laid in the field provides fluid communication to the control ports 28 of the valves 10.

During irrigation, matter such as grit, dirt or the like that exists in the liquid used for irrigation may accumulate over time and substantially block at least some of the irrigation being performed by the drip irrigation lines 76. In some cases periodic flushing of the drip irrigation lines 76 may assist to remove such matter from the lines 76 and thereby improve the ability of the irrigation system 74 to properly function.

In an embodiment of the present invention, the periodic flushing of the drip irrigation lines 76 is performed by providing a control signal to the valves 10 that triggers the valves to assume their open states and allow liquid flowing through the drip irrigation lines 76 to be flushed out of the lines to thereby remove such matter that may have accumulated in the lines 76.

In an embodiment, the control tube 78 is coupled to a fluid source (not shown) such as the source providing liquid to the irrigation system 74 and upon demand liquid from the source may be allowed to flow through the control tube 78 to enter the valves 10 at their control ports 28 and urge the valves 10 to assume their open states and allow the drip irrigation lines 76 that are coupled to the control tube 78 to be flushed.

In a non binding example, the control tube 78 is operatively coupled to a fluid source such as a manually operated pump and upon operation of the pump fluid such as air is urged to flow through the control tube 78 to enter the valves 10 at their control ports 28 and urge the valves 10 to assume their open states and allow the drip irrigation lines 76 that are coupled to the control tube 78 to be flushed.

In another embodiment, the valve 10 may fitted to a beginning of an irrigation line 76 (not shown) in order to control entry of liquid downstream into the line.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the invention as hereinafter claimed.

The invention claimed is:

1. An irrigation valve comprising:
    a liquid passage extending therethrough at least in part along an axis,
    a sealing diaphragm operatively coupled to the passage, and
    a control port for receiving a control signal, the control port not being in fluid communication with the liquid passage,
    the sealing diaphragm being held in the valve in a non clamped manner and being adapted to seal the passage,
    wherein upon receipt of a control signal the sealing diaphragm is urged to elastically bend to thereby open a path for liquid around the sealing diaphragm that flows downstream to exit the valve.

2. The irrigation valve according to claim 1, wherein the sealing diaphragm comprises opposing up and down surfaces and a peripheral side surface therebetween, the up and down surfaces respectively face upstream and downstream and at least a portion of the path for liquid around the sealing diaphragm flows in contact with the diaphragm along an imaginary route extending first upon the up surface then upon the side surface and then upon the down surface.

3. The irrigation valve according to claim 1, wherein the control signal is in the form of liquid pressure flowing inwards into the valve.

4. The irrigation valve according to claim 3 comprising an elastic control diaphragm located inward of the control port, the control diaphragm adapted to bend under the pressure of the control signal to thereby transfer a signal inwardly that causes the bending of the sealing diaphragm that forms the path around the sealing diaphragm.

5. The irrigation valve according to claim 4, wherein the control diaphragm when bended substantially seals the valve to inward flow of the control signal passed the control diaphragm.

6. The irrigation valve according to claim 1, wherein the sealing diaphragm is adapted to be biased axially upstream and axially downstream and at least when biased upstream is adapted to bear against a support of the valve and at least when biased downstream is adapted to bear against a rim of the valve, wherein the non clamped manner that the sealing diaphragm is held in the valve is characterized by the support not axially overlapping the rim.

7. The irrigation valve according to claim 6, wherein the sealing diaphragm when bearing against the rim seals the passage for liquid flow.

8. An irrigation pipe comprising an irrigation valve according to claim 1 configured to affect the flow through the pipe.

9. The irrigation pipe according to claim 8, wherein the irrigation valve is coupled to an end of the pipe and the opening of the path through the valve is adapted to flush liquid out of the pipe.

10. The irrigation pipe according to claim 8, wherein the irrigation valve is coupled to a beginning of the pipe and the opening of the path through the valve is adapted to allow liquid to flow downstream into the pipe.

11. An irrigation valve having an axis (X) defining an upstream end provided with an inlet and a downstream end provided with a control port; the irrigation valve comprising:
a base provided at the upstream end of the valve, the base having an axially extending lumen and a support facing downstream, the inlet being associated with the base;
a casing provided at the downstream end of the valve, the control port being associated with the casing;
a partition having an upper cavity facing the downstream end and a lower cavity facing the upstream end, the upper and lower cavities extending axially one after the other and connected by a rim;
a piston passing between the upper and lower cavities of the partition;
at least one control diaphragm located between the control port and the piston; and
at least one sealing diaphragm positioned in the valve between the support and the rim, wherein:
introduction of fluid pressure via the control port causes the control diaphragm to flex and urge the piston towards the upstream end, resulting in the piston flexing the at least one sealing diaphragm and opening a path for liquid between the inlet and the at least one outlet; and
the rim and the support do not overlap in a direction along the axis (X).

12. The irrigation valve according to claim 11, wherein:
the support comprises a plurality of spaced apart seats about the axis (X) which collectively define an effective supporting region of the support.

13. The irrigation valve according to claim 12, wherein:
the sealing diaphragm has a width (W2) measured along the axis (X) that is smaller than an axial distance (C2) between the rim and the seats of the support.

14. The irrigation valve according to claim 11, wherein:
the control diaphragm has a width (W1) measured along the axis (X) that is smaller than an axial distance (C1) between portions of the valve that axially confine the control diaphragm.

15. The irrigation valve according to claim 11, wherein:
the lower cavity comprises a downwardly facing roof, and a shroud formed about a perimeter of the roof and projecting axially upstream below the roof;
the upper cavity comprises an aperture and opens down into the lower cavity at the rim; and
the rim protrudes down beyond the roof into the lower cavity.

16. An irrigation pipe comprising irrigation valve according to claim 11 coupled to an end of the pipe.

17. An irrigation valve having an axis (X) defining an upstream end provided with an inlet and a downstream end provided with a control port; the irrigation valve comprising:
a base provided at the upstream end of the valve, the base having an axially extending lumen and a support facing downstream, the inlet being associated with the base;
a casing provided at the downstream end of the valve, the control port being associated with the casing;
a partition having an upper cavity facing the downstream end and a lower cavity facing the upstream end, the upper and lower cavities extending axially one after the other and connected by a rim;
a piston passing between the upper and lower cavities of the partition;
at least one control diaphragm located between the control port and the piston; and
at least one sealing diaphragm positioned in the valve between the support and the rim, wherein:
introduction of fluid pressure via the control port causes the control diaphragm to flex and urge the piston towards the upstream end, resulting in the piston flexing the at least one sealing diaphragm and opening a path for liquid between the inlet and the at least one outlet;
the support comprises a plurality of spaced apart seats about the axis (X) which collectively define an effective supporting region of the support; and
the sealing diaphragm has a width (W2) measured along the axis (X) that is smaller than an axial distance (C2) between the rim and the seats of the support.

18. The irrigation valve according to claim 17, wherein:
the lower cavity comprises a downwardly facing roof, and a shroud formed about a perimeter of the roof and projecting axially upstream below the roof;
the upper cavity comprises an aperture and opens down into the lower cavity at the rim; and
the rim protrudes down beyond the roof into the lower cavity.

19. The irrigation valve according to claim 17, wherein:
the control diaphragm has a width (W1) measured along the axis (X) that is smaller than an axial distance (C1) between portions of the valve that axially confine the control diaphragm.

20. An irrigation pipe comprising the irrigation valve according to claim 17 coupled to an end of the pipe.

21. An irrigation system comprising:
a plurality of drip irrigation lines;
a valve coupled to an end of each drip irrigation line, each valve comprising a passage, a sealing diaphragm adapted to seal the passage and a control port that is adapted to receive a control signal for urging the sealing diaphragm to elastically deform and open the passage;
a fluid source; and
a control tube connecting the fluid source to each of the plurality of drip irrigation lines, the control tube being in fluid communication with the control port of each valve; wherein
fluid from the fluid source is configured to enter, via the control tube, each valve at its control port to apply a control signal in the form of pressure to urge the valve to open and allow liquid from the drip irrigation line to be flushed downstream.

22. The irrigation system according to claim 21, wherein the fluid source comprises a manually operated pump.

23. The irrigation system according to claim 21, wherein the fluid source is also the source providing liquid to the irrigation system.

24. The irrigation system according to claim 21, wherein upon cessation of pressure at the control port the sealing diaphragm is adapted to seal back the passage of the valve.

* * * * *